US008531699B2

(12) United States Patent
Sussmeier et al.

(10) Patent No.: US 8,531,699 B2
(45) Date of Patent: Sep. 10, 2013

(54) ITEM TRANSPORT SYSTEM WITH PNEUMATIC ALIGNER

(75) Inventors: John W. Sussmeier, Cold Spring, NY (US); Boris Rozenfeld, New Milford, CT (US); Charles C. Fuller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1350 days.

(21) Appl. No.: 12/261,567

(22) Filed: Oct. 30, 2008

(65) Prior Publication Data

US 2010/0110507 A1 May 6, 2010

(51) Int. Cl.
*G06F 3/12* (2006.01)

(52) U.S. Cl.
USPC .............. 358/1.15; 271/90; 271/91; 271/226; 271/282

(58) Field of Classification Search
USPC .......................................................... 358/1.12
See application file for complete search history.

(56) References Cited

U.S. PATENT DOCUMENTS

| | | | | |
|---|---|---|---|---|
| 6,715,755 | B2 | 4/2004 | Sussmeier | |
| 2004/0207708 | A1* | 10/2004 | Ohashi et al. | 347/104 |
| 2005/0097867 | A1* | 5/2005 | Sammaritano et al. | 53/492 |
| 2006/0285874 | A1* | 12/2006 | Domoto et al. | 399/105 |
| 2010/0052237 | A1* | 3/2010 | Herczeg et al. | 271/3.16 |

* cited by examiner

*Primary Examiner* — Benny Q Tieu
*Assistant Examiner* — Marcellus Augustin
(74) *Attorney, Agent, or Firm* — Michael J. Cummings; Charles R. Malandra, Jr.; Steven J. Shapiro

(57) ABSTRACT

An item transport system includes an input transport for receiving items along a first transport path, an angle transport for conveying the items along a second transport path disposed at an angle with respect to the first transport path, an alignment transport for conveying the items along a third transport path disposed at approximately 90 degrees to the first transport path, and an alignment surface for engaging the items while the items are conveyed in the alignment transport. The alignment transport may include an alignment nip comprising a driven element and an idler element for engaging opposing surfaces of the items, a manifold, a source providing pressurized gas to the manifold, and an orifice in the manifold proximate to the third transport path, wherein the idler element is disposed in the orifice.

14 Claims, 3 Drawing Sheets

ITEM TRANSPORT SYSTEM WITH PNEUMATIC ALIGNER

FIELD OF THE INVENTION

The present invention relates to an item transport system and, more particularly, to an item transport having a pneumatic aligner.

BACKGROUND OF THE INVENTION

Inserter systems are used to create mailpieces for a range of applications. Inserters utilize a generally modular array of components to carry out the various processes associated with mailpiece creation. The processes include preparing documents, assembling the documents associated with a given mailpiece, adding any designated inserts, inserting the assembly into an envelope, and processing the stuffed envelopes. Such processing may include multiple steps, including sealing the envelopes, edge marking, applying a postage indicia, outsorting, and stacking the completed mailpieces.

An important feature in the operation of inserter systems is the ability to maintain a desired spacing between the assembled mailpieces as they undergo output processing, for example. Such spacing allows the various output processing devices to process a given mailpiece and then reset for a subsequent mailpiece.

The change in spacing between consecutive mailpieces is known as “pitch dither.” Minimizing pitch dither allows inserter systems, for example, to process mailpieces more consistently and avoid jams. For example, if the spacing between mailpieces becomes too small, the output processing devices may be unable to process all of the mailpieces. In one example, a printer may be unable to properly position an edge marking or a bar code in the same location on mailpieces in a given batch. In another example, if the spacing between subsequent mailpieces is not maintained, the mailpieces may collide, causing a jam.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In accordance with the purpose of the invention, as embodied and broadly described herein, one aspect of the invention relates to an item transport system comprising an input transport for receiving items along a first transport path, an angle transport for conveying the items along a second transport path disposed at an angle with respect to the first transport path, an alignment transport for conveying the items along a third transport path disposed at approximately 90 degrees to the first transport path, and an alignment surface for engaging the items while the items are conveyed in the alignment transport.

The alignment transport may comprise an alignment nip comprising a driven element and an idler element for engaging opposing surfaces of the items, a manifold, a source providing pressurized gas to the manifold, and an orifice in the manifold proximate to the third transport path, wherein the idler element is disposed in the orifice.

As used herein, “items” include papers, documents, postcards, envelopes, brochures, enclosures, booklets, media items, including CDs, DVDs, computer disks, and/or other digital storage media, and packages having a range of sizes and materials.

In another aspect, the invention relates to a method of transporting items in an item transport system comprising receiving the items in an input transport along a first transport path, conveying the items in an angle transport along a second transport path disposed at an angle with respect to the first transport path, conveying the items in an alignment transport along a third transport path disposed at approximately 90 degrees to the first transport path, and engaging the items with an alignment surface while conveying the items in the alignment transport.

Conveying the items in the alignment transport may comprise engaging the items in an alignment nip comprising a driven element and an idler element for engaging opposing surfaces of the items, providing pressurized gas to a manifold, and disposing the idler element in an orifice in the manifold proximate to the third transport path.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Embodiments of the item transport system according the invention are described with reference to certain applications in mailpiece inserter systems. It should be understood, however, that the system of the invention may be used in association with other systems configured to handle and transport items. In addition, exemplary embodiments of the invention are described in association with the processing of envelopes. It should be further understood that the system of the invention may be utilized for processing other items, as that term is defined herein.

Figure 1:
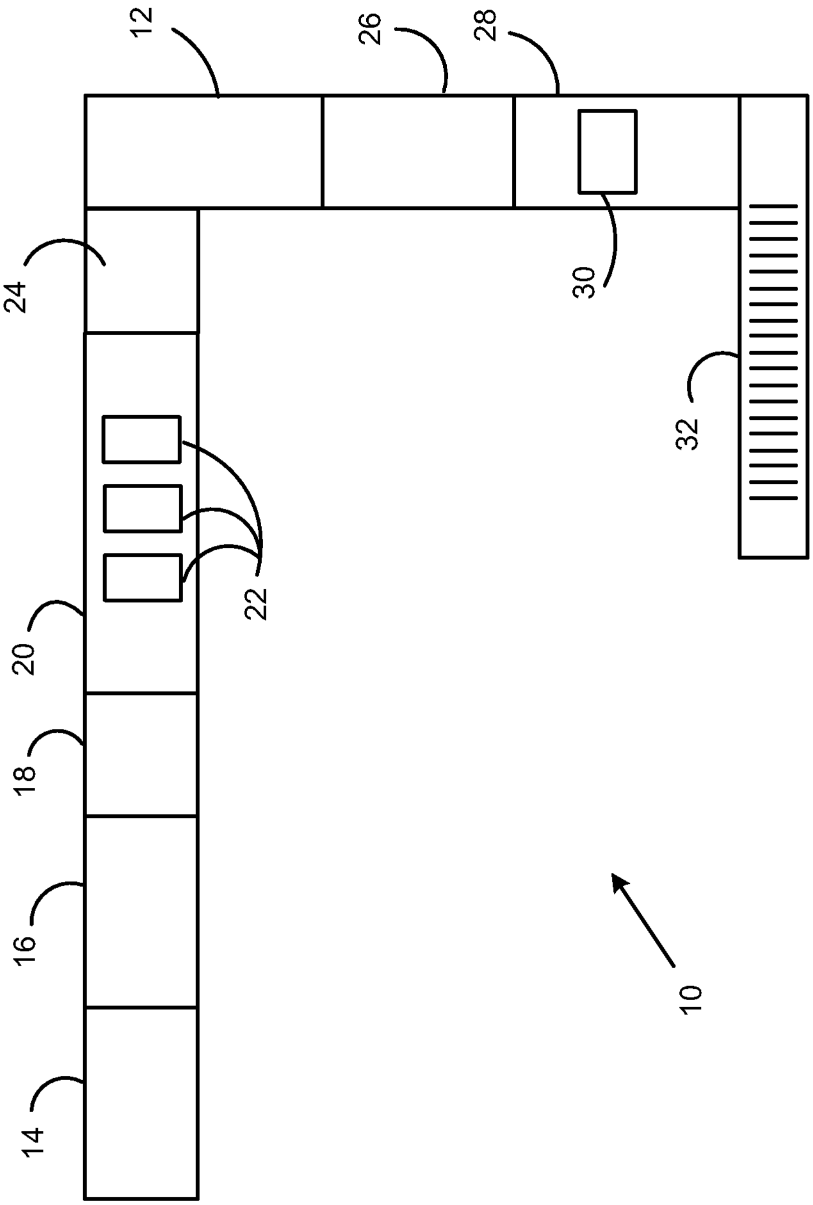
FIG. 1 is a schematic view of an inserter system utilizing an embodiment of the item transport system of the present invention.

A schematic view of an inserter system 10 incorporating the item transport system 12 of the invention is shown in FIG. 1. The illustrated exemplary inserter system 10 comprises a sheet feeder 14, which provides pre-printed documents for processing. The documents, which may comprise bills or financial statements, for example, may be provided by the sheet feeder 14 as individual “cut sheets,” or may be cut from a spool or a fan-fold stack using a web cutter (not shown).

The documents next move to an accumulator 16, where the documents for respective mailpieces are assembled and folded. The folded accumulations next move to a buffer 18, which holds the accumulations for sequential processing. The accumulations next move to a chassis 20. As each accumulation moves through the chassis, inserts from a plurality of feeder modules 22 are added to the accumulation.

The accumulations next enter an envelope insertion station 24, where the finished accumulations are inserted into envelopes provided by an envelope hopper (not shown).

The stuffed envelopes move into the item transport system 12 according to the invention, where the envelopes undergo a right-angle transfer, transitioning from motion in a depthwise orientation to motion in a lengthwise orientation. The operation of the item transport system is described in more detail below.

The envelopes next move into the output processing module 26 for sealing and outsorting, if required. Other output processing, such as weighing, for example, may also be carried out. The envelopes then enter a printing area 28, where markings, such as a postage indicia and/or address information, for example, are applied using a printer 30. Finally, the completed mailpieces are deposited on a stacker 32, comprising a conveyor, for example.

Figure 2:
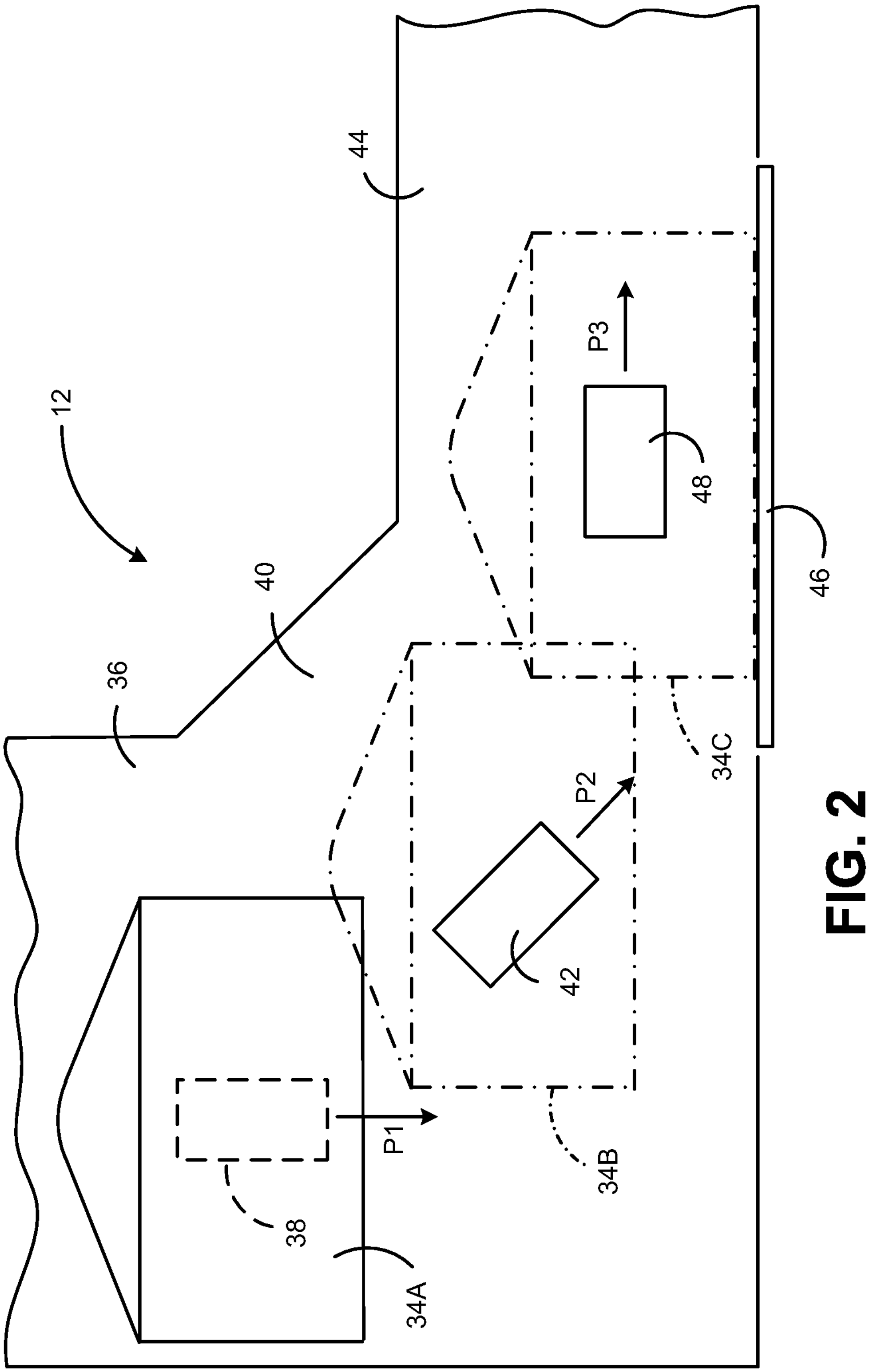
FIG. 2 is a schematic view of an embodiment of the item transport system of the present invention.

An embodiment of the item transport system 12 of the invention is shown schematically in FIG. 2, in which an item 34 (e.g., envelope) is shown at three successive positions 34A, 34B, 34C, respectively, as it moves through the system 12. The item transport system 12 in the illustrated embodiment comprises an input transport 36 for receiving items 34 along a first transport path P1. The item 34A is shown on the input transport 36. Items 34 are conveyed on the input transport 36 using an input transport element 38. In one embodiment, the input transport element 38 comprises a belt, but other drive arrangements may be used. The input transport element 38 drives the item 34A along the first transport path P1.

The system 12 shown in FIG. 2 further comprises an angle transport 40 for conveying the items 34 along a second transport path P2 disposed at an angle with respect to the first transport path P1. The item 34B is shown on the angle transport 40. In one embodiment, the second transport path P2 is disposed at approximately 45 degrees to the first transport path P1. Other path arrangements may also be used.

Items 34 are conveyed on the angle transport 40 using an angle transport element 42. In one embodiment, the angle transport element 42 comprises a nip having a driven roller and an idler roller aligned with the second transport path P2. Other numbers of nips, as well as other angle transport elements, may also be used. The driven roller may be driven using a servo motor and a controller (not shown). Other driving arrangements may also be used.

The item transport system shown in FIG. 2 further comprises an alignment transport 44 for conveying the items 34 along a third transport path P3 disposed at approximately 90 degrees to the first transport path P1. The item 34C is shown on the alignment transport 44.

The illustrated item transport system 12 further comprises an alignment surface 46 for engaging the items 34 while the items are conveyed in the alignment transport 44. In one embodiment, the alignment surface 46 comprises a driven belt for engaging an edge of the items 34 to drive the items along the third transport path P3.

Figure 3:
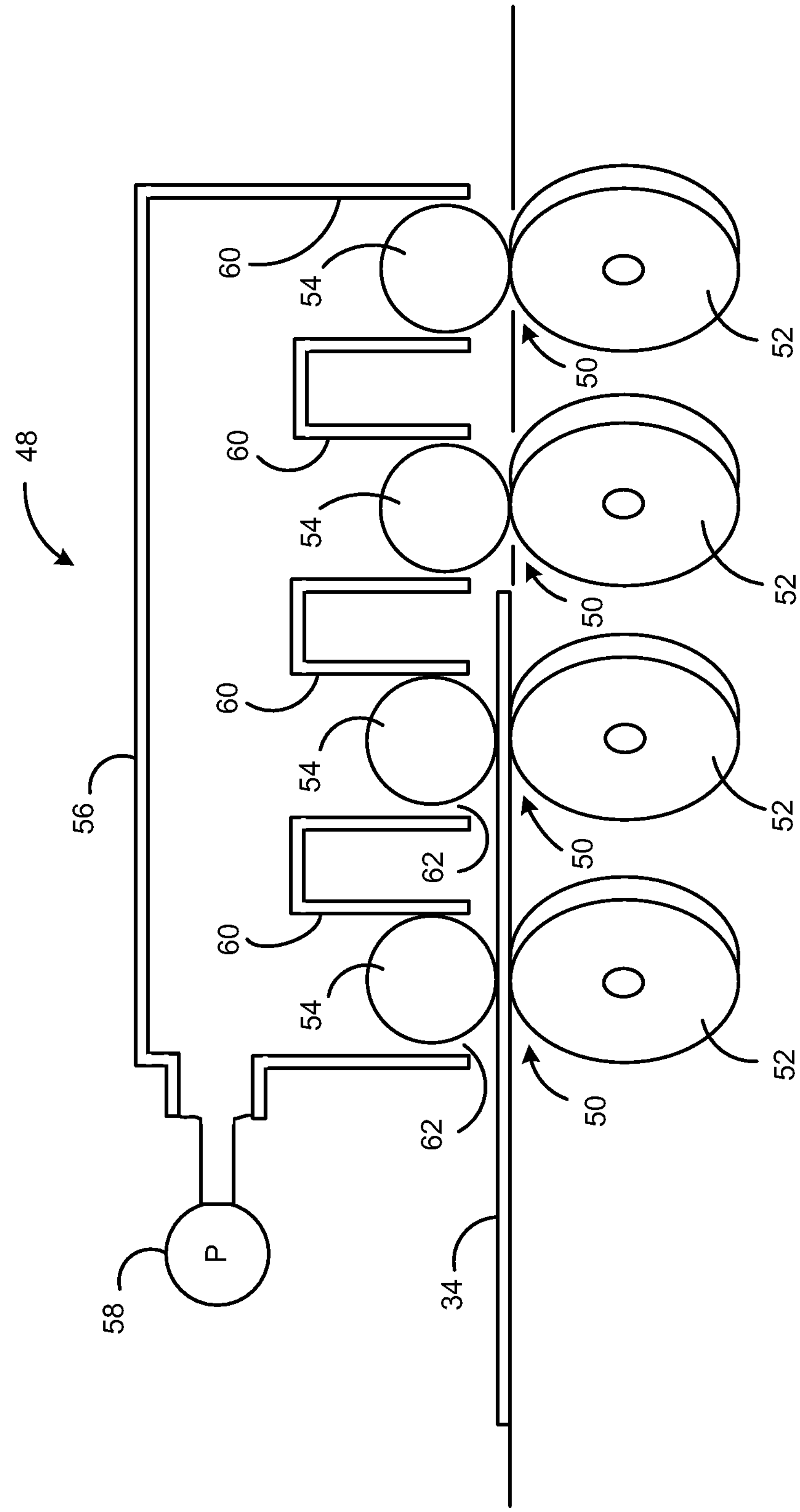
FIG. 3 is a side view of an embodiment of an alignment transport element of the present invention.

Items 34 are conveyed on the alignment transport 44 using an alignment transport element 48. As shown in FIG. 3, the alignment transport element comprises an alignment nip 50 comprising a driven element 52 and an idler element 54 for engaging opposing surfaces of the items 34. Four alignment nips 50 are shown in the embodiment of FIG. 3, but a different number of nips may also be used. In FIG. 3 an item 34 is shown entering the first two alignment nips 50 of the alignment transport 44.

In one embodiment, the driven elements 52 of the alignment nips 50 are disposed at an angle to the alignment surface 46 in order to guide conveyed items 34 toward the alignment surface 46, while simultaneously conveying the items 34 along the third transport path P3. In one embodiment, the driven elements 52 of the alignment nips 50 are disposed at approximately 25 degrees to the alignment surface 46.

The driven element 52 shown in FIG. 3 comprises a driven roller. In one embodiment, the driven element 52 is driven using a servo motor and a controller (not shown). Other driving arrangements may also be used.

The idler element 54 comprises a relatively lightweight, substantially spherical element. In one embodiment, the idler element 54 comprises a hollow, polypropylene ball having a diameter of approximately 1.75 inches and weighing approximately 0.3 ounces. Idler elements comprising other materials and having different sizes may also be used.

The alignment transport element 48 further comprises a manifold 56 and a source 58 providing pressurized gas to the manifold 56. The manifold 56 is provided with an orifice 60 proximate to the third transport path P3. The manifold 56 shown in FIG. 3 comprises an orifice 60 associated with each alignment nip 50. The idler element 54 of each nip 50 is disposed in a respective orifice 60.

In one embodiment, the pressurized gas provided to the manifold 56 comprises air. Other gases may also be used. The source 58 providing pressurized gas may comprise a dedicated source, such as a blower, for example. Alternatively, the source may comprise a device for processing the items that is not associated with the item transport system 12. For example, the pressurized gas may be provided by the exhaust side of a blower system associated with a vacuum deck transport upstream of the item transport system 12. Gas sources associated with other upstream or downstream devices may also be used.

The pressure in the manifold 56 is regulated to provide a desired force on each of the idler elements 54. In some embodiments, the idler elements 54 provide a substantially constant force on the items 34 in a direction substantially perpendicular to the third transport path P3. The force may be determined based on the pressure in the manifold 56 and the diameter of the idler elements 54. In one embodiment, the pressure in the manifold 56 is regulated to approximately 0.05 pounds per square inch in order to deliver approximately 2 ounces of force to each idler element 54 having a diameter of approximately 1.75 inches.

In the illustrated embodiment, each orifice 60 has a substantially circular shape and receives a respective idler element 54 having a substantially spherical shape. As shown in FIG. 3, the maximum diameter of the idler element 54 is less than the diameter of the orifice 60. In one example, idler elements 54 having a diameter of approximately 1.75 inches are disposed in respective orifices 60 having a diameter of approximately 1.76 inches. The resulting gap around the idler element allows the gas to leak around the idler element.

In operation, as an item enters an alignment nip, the item forces the idler element laterally to the downstream side of the respective orifice, creating a gap 62 on the upstream side of the orifice 60. FIG. 3 shows an item 34 in the alignment transport 44 that has entered the first two alignment nips 50. The upstream gaps 62 for those alignment nips are shown in FIG. 3.

The relatively high air leak rate in the gaps 62 creates a region of low pressure in accordance with Bernoulli's equation applied to compressible air flow. The low pressure region produces a self-centering, restoring force on the idler elements 54. The use of air to load the idler elements 54 and, in particular, the restoring force on the idler elements 54 will reduce rolling friction in the system and may provide a smoother transition of items 34 between the alignment nips 50.

In addition, the relatively low mass of the idler elements 54 and the constant force provided by the air flow may help maintain the idler elements 54 in contact with items 34 being conveyed. Accordingly, the item transport system 12 of the present invention may minimize the pitch dither of items 34 undergoing output processing, thereby increasing the system's reliability. In some embodiments of the item transport system 12, the pitch dither was reduced to +/−9 milliseconds from +/−23 milliseconds, which had been achieved with conventional devices.

The operation of the item transport system 12 in transporting an item 34 will be described with reference to FIG. 2.

The item 34A is initially received in the input transport 36 from an upstream component along the first transport path P1. Next, the item 34 is conveyed in the angle transport 40 along a second transport path P2 disposed at an angle with respect to the first transport path P1. The item 34 is then conveyed in an alignment transport 44 along a third transport path P3 disposed at approximately 90 degrees to the first transport path P1. Finally, the item 34 is engaged with an alignment surface 46 while being conveyed in the alignment transport 44.

In one example, in order to process 26,000 items per hour in the item transport system, the items are conveyed in the direction of the third transport path P3 at a velocity of 100 inches per second. The various transport elements are run at particular speeds in order to maintain the velocity component of the items along the third transport path P3.

In the case where the second transport path P2 is disposed at approximately 45 degrees to the first transport path, the angle transport element is run at (100 inches per second)*(cosine 45 degrees)=141 inches per second. Further, in the case where the driven elements of the alignment nips are angled at approximately 25 degrees to the alignment surface, the driven rollers of the alignment transport element are driven at (100 inches per second)*(cosine 25 degrees)=110 inches per second. Lastly, in systems where the alignment surface comprises a driven belt, the driven belt, which is aligned with the third transport path P3, is driven at 100 inches per second.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. An envelope alignment transport for aligning an edge of transported envelopes so that the edge is aligned with an alignment surface that is parallel to a direction of transport of the envelopes, the alignment transport comprising:

an alignment nip comprising a driven element and an idler element for engaging opposing surfaces of the items, the driven element angled so as to provide a driving force in the direction of transport and towards the alignment surface, the idler element comprising a spherical roller that is free to roll in any direction;

a manifold;

a source providing pressurized gas to the manifold; and an orifice in the manifold proximate to the third transport path, wherein the spherical roller idler element is disposed in the orifice, and wherein the spherical roller fits loosely in the orifice so that the pressurized gas can flow out of the orifice to provide a normal force on envelopes in the alignment nip; and wherein the alignment surface configured for engaging the envelopes while the envelopes are conveyed in the envelope alignment transport.

2. The envelope alignment transport of claim 1, wherein the driven element is disposed at approximately 45 degrees to the direction of transport.

3. The envelope alignment transport of claim 1, wherein the envelope alignment transport comprises a plurality of alignment nips.

4. The envelope alignment transport of claim 1, wherein the idler element provides a substantially constant force on the envelopes transported therein.

5. The envelope alignment transport of claim 1, wherein a maximum diameter of the idler element is less than a diameter of the orifice.

6. The envelope alignment transport of claim 1, wherein the pressurized gas comprises air.

7. The envelope alignment transport of claim 1, wherein the alignment surface comprises a driven belt for engaging the edge of the envelopes to drive the envelopes along the transport direction.

8. A method of conveying envelopes in an envelope alignment transport for aligning an edge of transported envelopes so that the edges are aligned with an alignment surface that is parallel to a direction of transport of the envelopes, the method comprising:

engaging the envelopes in an alignment nip comprising a driven element and an idler element for engaging opposing surfaces of the envelopes, the driven element angled so as to provide a driving force in the direction of transport and towards the alignment surface, the idler element comprising a spherical roller that is free to roll in any direction;

providing pressurized gas to a manifold; and disposing the spherical roller idler element in an orifice in the manifold, and wherein the spherical roller fits loosely in the orifice so that the pressurized gas can flow out of the orifice to provide a normal force on envelopes in the alignment nip; and engaging the envelopes with the alignment surface while conveying the items in the envelope alignment transport.

9. The method of claim 8 including positioning driven element at approximately 45 degrees to the direction of transport.

10. The method of claim 8 wherein the alignment transport comprises a plurality of alignment nips.

11. The method of claim 8, wherein the idler element provides a substantially constant force on the envelopes.

12. The method of claim 8, wherein a maximum diameter of the idler element is less than a diameter of the orifice.

13. The method of claim 8, wherein the pressurized gas comprises air.

14. The method of claim 8, wherein the alignment surface comprises a driven belt for engaging the edge of the envelopes to drive the envelopes along the direction of transport.

* * * * *